United States Patent
Nitsche et al.

(10) Patent No.: US 11,663,380 B2
(45) Date of Patent: May 30, 2023

(54) METHOD FOR TRANSFERRING A STRESS STATE (STRESS SENSOR) OF AN FE SIMULATION RESULT TO A NEW FE MESH GEOMETRY OF A MODELED CONSTRUCTION SYSTEM IN A SIMULATION CHAIN OF PRODUCTION OPERATIONS

(71) Applicant: inpro Innovationsgesellschaft für fortgeschrittene Produktionssysteme in der Fahrzeugindustrie mbH, Berlin (DE)

(72) Inventors: Martin Nitsche, Berlin (DE); Heribert Wessels, Berlin (DE)

(73) Assignee: inpro Innovationsgesellschaft für fortgeschrittene Produktionssysteme in der Fahrzeugindustrie mbH, Berline (DE)

( * ) Notice: Subject to any disclaimer, the term of this patent is extended or adjusted under 35 U.S.C. 154(b) by 393 days.

(21) Appl. No.: 16/082,304

(22) PCT Filed: Mar. 2, 2017

(86) PCT No.: PCT/DE2017/000054
§ 371 (c)(1),
(2) Date: Sep. 5, 2018

(87) PCT Pub. No.: WO2017/157363
PCT Pub. Date: Sep. 21, 2017

(65) Prior Publication Data
US 2019/0087520 A1     Mar. 21, 2019

(30) Foreign Application Priority Data
Mar. 12, 2016 (DE) ..................... 10 2016 003 017.8

(51) Int. Cl.
*G06F 30/23* (2020.01)
*G06F 30/15* (2020.01)
(Continued)

(52) U.S. Cl.
CPC .............. *G06F 30/23* (2020.01); *G06F 30/15* (2020.01); *G06F 2111/10* (2020.01);
(Continued)

(58) Field of Classification Search
CPC ...... G06F 30/23; G06F 30/15; G06F 2111/10; G06F 2111/20; G06F 2113/22;
(Continued)

(56) References Cited

U.S. PATENT DOCUMENTS

| 7,382,367 B1 | 6/2008 | Lu et al. |
| 2006/0050987 A1* | 3/2006 | Shimada ................. G06T 17/20 382/285 |

(Continued)

FOREIGN PATENT DOCUMENTS

| DE | 102012006965 A1 | 11/2012 |
| WO | WO2004079341 A2 | 9/2004 |

OTHER PUBLICATIONS

Maker et al. "Input Parameters in Springback Simulation using LS-DYNA" Livermore, CA: Livermore Software Technology Corporation, 2001 [retrievd on Nov. 16, 2020], Retrieved from <http://www.feainformation.com/metal/springback_parameters.pdf> (Year: 2012).*

(Continued)

*Primary Examiner* — Rehana Perveen
*Assistant Examiner* — Alfred H B Wechselberger
(74) *Attorney, Agent, or Firm* — Laine IP Oy

(57) ABSTRACT

The invention relates to a method for transferring a stress state of an FE simulation result to a new FE mesh geometry
(Continued)

of a simulated construction system, such as a component for motor vehicles that has a 3-D shape, in a simulation chain of production operations, comprising: a) providing a first data set, which describes the FE simulation result with a stress state of the FE simulation of the construction system or component of a first production operation, b) creating the new FE mesh geometry of the simulated construction system or component, which new FE mesh geometry is associated with a second production operation, c) transferring the stress state of the provided first data set to the new FE mesh geometry of the construction system or component, d) performing an equilibrium calculation by using the stress tensor in the FE mesh geometry, wherein deformation of the construction system or component results, which deformation differs from the deformation in the FE mesh by a shape alteration u>tolerance value ε, e) iteratively repeating the equilibrium calculation as a cyclic equilibrium iteration in the new FE mesh geometry (in the new target FE mesh) of the construction system or component, wherein, in each cycle, a new stress state is applied to the FE mesh geometry of the construction system or component and stress components that lead to undesired shape alterations are decreased until a displacement/termination criterion of shape alteration u<tolerance value ε is achieved, and f) displaying the fulfilled condition of u<ε.

9 Claims, 4 Drawing Sheets

(51) Int. Cl.
- *G06F 111/10* (2020.01)
- *G06F 111/20* (2020.01)
- *G06F 113/22* (2020.01)
- *G06F 113/24* (2020.01)

(52) U.S. Cl.
CPC ....... *G06F 2111/20* (2020.01); *G06F 2113/22* (2020.01); *G06F 2113/24* (2020.01)

(58) Field of Classification Search
CPC .... G06F 2113/24; G06F 30/25; G06F 30/367; G06F 30/398; G06F 2111/00–2119/22
See application file for complete search history.

(56) References Cited

U.S. PATENT DOCUMENTS

| | | | |
|---|---|---|---|
| 2006/0201229 A1* | 9/2006 | Zhu | G05B 19/404 72/413 |
| 2008/0004850 A1* | 1/2008 | Wang | G06F 30/23 703/13 |
| 2009/0119031 A1* | 5/2009 | Niwa | B21D 22/02 702/43 |
| 2011/0166843 A1* | 7/2011 | Hsu | G06F 30/20 703/10 |
| 2011/0172803 A1* | 7/2011 | Suzuki | B21D 22/00 700/103 |
| 2015/0363524 A1 | 12/2015 | Ilinich et al. | |
| 2016/0314601 A1* | 10/2016 | Sankaran | G06T 7/20 |
| 2016/0334544 A1* | 11/2016 | Mookanahallipatna Ramasesha | G01V 11/00 |

OTHER PUBLICATIONS

Narashimhan et al. "Predicting springback in sheet metal forming: an explicit to implicit sequential solution procedure" Finite Elements in Analysis and Design, vol. 33, pp. 29-42 [retrieved on Dec. 22, 2020], (Year: 1999).*
Dutton et al. "Visualisation of Surface Defects in Sheet Metal Panels" International LS-DYNA Conference, Detroit, Michigan, 1998 [ retrieved on Dec. 23, 2020], (Year: 1998).*
Yang et al. "Recent trends in numerical simulation of three-dimensional sheet forming processes" Proc. of the Ins. of Mechanical Engineers, Part B: Journal of Eng. Manuf., vol. 217, Iss. 11, pp. 1553-1570 [retrieved on Dec. 22, 2020] (Year: 2003).*
Burchitz, I. A. "Improvement of Springback Prediction in Sheet Metal Forming" Project No. MC1.02121, Netherlands Institute for Metals Research [retrieved on Nov. 16, 2020], (Year: 2008).*
Muthler et al. "High order finite elements applied to the computation of elastic spring back in sheet metal forming" Materials Processing and Design: Modeling, Simulation and Applications, Pts 1 and 2; ISBN: 0-7354-0188-8 [retrieved on Dec. 22, 2020] (Year: 2004).*
Wang, F. "Numerical Studies of Residual Stress in Cold Formed Steel Sigma Sections" [Thesis] School of Civil Engineering, University of Birmingham [retrieved on Sep. 29, 2022] (Year: 2015).*
Kose, K., et al. "Approaching a reliable process simulation for the virtual product development." 146 ICTP [retrieved on Mar. 15, 2023] (Year: 2005).*
Afazov, S. "Modelling and simulation of manufacturing process chains" CIRP Journal of Manufacturing Science and Technology vol. 6, pp. 70-77 [[retrieved on Mar. 15, 2023] (Year: 2013).*
Tekkaya et al. "Accuracy, reliability and validity of finite element analysis in metal forming: a user's perspective" Engineering Computations vol. 26, No. 8, pp. 1026-1055; DOI:10.1108/02644400910996880 [retrieved on Mar. 15, 2023] (Year: 2009).*
Papadakis, L. "Simulation of the Structural Effects of Welded Frame Assemblies in Manufacturing Process Chains" [Thesis[ Technical University at Munchen, Germany [retrieved on Mar. 15, 2023] (Year: 2008).*
Zaeh et al. "Simulation of the manufacturing process chain of welded frame structures" Prod. Eng. Res. Devel., vol. 2, pp. 385-393; DOI:10.1007/s11740-008-0122-4 [retrieved on Mar. 15, 2023] (Year: 2008).*
Lin, Y. "The Application of Finite Element Process Simulation on Cold Forming" [Thesis] Laval University, Canada; ISBN:0-612-88834-7 [retrieved on Mar. 15, 2023] (Year: 2003).*
Lee et al. "Error indicators and adaptive remeshing in large deformation finite element analysis" Finite Elements in Analysis and Design, vol. 16 , pp. 99-139 [retrieved on Mar. 15, 2023] (Year: 1994).*
Wang et al. "A dynamic large deformation finite element method based on mesh regeneration" Computers and Geotechnics, vol. 54 , pp. 192-201 [retrieved on Mar. 15, 2023] (Year: 2013).*
Andersen, L. "Residual Stresses and Deformations in Steel Structures" [Thesis] Department of Naval Architectures, Technical University of Denmark, p. 57 [retrieved on Mar. 15, 2023] (Year: 2000).*
Grote K.-H. et al: Dubbel—Taschenbuch für den Maschinenbau, Springer-Verlag, 21st Edition, 2001, pp. C 47 to C 54.
Najafi A et al: Sequential coupled process-performance simulation and multi-objective optimization of thin-walled tubes. Materials And Design, London, vol. 41, Mar. 29, 2012, pp. 89-98.

* cited by examiner

METHOD FOR TRANSFERRING A STRESS STATE (STRESS SENSOR) OF AN FE SIMULATION RESULT TO A NEW FE MESH GEOMETRY OF A MODELED CONSTRUCTION SYSTEM IN A SIMULATION CHAIN OF PRODUCTION OPERATIONS

FIELD OF THE INVENTION

The invention relates to a method for transferring a stress state (stress tensor) of an FE simulation result to a new FE mesh geometry of a modeled construction system such as a component for motor vehicles that has a 3-D shape, in a simulation chain of production operations.

BACKGROUND OF THE INVENTION

From DE 10 2012 006 965 A1 the simulating of shaping operations of a composite part having a 3-D shape and an anisotropic layer is known. The shaping operations can be, for example, pressing- and deep drawing operations, which are able to be simulated by means of software solutions available on the market and/or individual software solutions. In particular, software solutions are known which are generally available under the trade names LS DYNA or PAM-FORM. To simulate the shaping operation, the programs are fed with a material which characterizes a blank. In addition, further parameters which relate to a shaping tool and/or similar are provided before the simulation.

In the method known from DE 10 2012 006 965 A1 for simulating a shaping method of a composite part for a motor vehicle that has a 3-D shape and an anisotropic layer, the following method steps take place:

I) Providing a data set describing the 3-D shape,

II) simulated draping of a simulated planar semi-finished product of the composite part onto the 3-D shape, III) determining a simulated blank of the planar semi-finished product of the composite part as a function of the draping.

A method step Z can be interposed here between the method steps II) and III) to check whether the simulated draping according to method step II) fulfils a quality criterion such that no excessive material stresses occur during the simulated draping. If in the method step IV) a non-maintaining of the quality criterion and thereby the presence of excessive material stresses are established, then in a step V) the three-dimensional shape and/or the data set describing the latter is adapted so that as far as possible no material stresses occur during the simulated draping. The result obtained in step V) is delivered to the data set in accordance with step I). The loop of the steps I), II), IV) and V) can be run through multiple times iteratively, until the quality criterion in step IV) is fulfilled. Subsequently, step III) is carried out, which carries out the simulated blank on the basis of the last repetition of step II).

A shaping simulation can be carried out in particular by a finite elements method, also designated as FEM, as can be seen from "Dubbel-Taschenbuch für den Maschinenbau", 20$^{th}$ edition, Springer-Verlag, 2001, C 48 to C 50. By means of finite elements, stability problems of all kinds, e.g. for stress distribution or stability, are solved numerically. For example, it is determined how a system of elastic bodies deforms and bends under external stresses, and how the bodies move relative to one another. A computer-accessible construction of a system which is to be examined is provided. In the construction, a particular quantity of so-called nodes is established, by means of which corners of surface- or volume elements, designated as finite elements (FE), are formed. Curved surfaces or bodies which are treated approximately as surfaces, e.g. metal sheets of a body of a motor vehicle, are frequently deconstructed here into shell elements.

The nodes form a mesh in the construction, wherein the establishing of the nodes and the generation of FEs are designated as a meshing of the construction. Depending on the problem, the displacements of these nodes or the stresses in these FEs as introduced as unknowns. Equations are set up, which approximately describe the displacements, rotations or stresses within an FE. Further equations result from dependencies between different FEs, e.g. from the fact that the equilibrium must be fulfilled in the nodes and the calculated displacements must be constant and must fulfil the boundary conditions, so that gaps and penetrations do not occur.

This type of simulation can be used in particular for homogeneous materials such as steel sheets.

Different bodies of a construction system are frequently meshed independently of one another. For example, the system can be a part of a body of a motor vehicle which is to be constructed which overlaps subsections, wherein the bodies are partial systems which are constructed by different suppliers in a chronologically parallel manner, without the meshes being adapted to one another. Because the bodies are meshed independently of one another, the nodes often do not lie on one another on surfaces of the bodies which adjoin one another, but rather they belong to finite elements of different sizes and different orientations in space. Such meshes of adjoining bodies are designated as incompatible meshes.

A finite element simulation which is close to reality must take into account interactions and dependencies of different bodies, which are brought about owing to surfaces adjoining one another.

Thus, for example, in a virtual production process chain which overlaps subsections, after the transferring of a stress state (stress tensor) from an FE simulation result to a new target FE mesh, with the use of the result in a subsequent FE simulation, undesired shape alterations occur, which can be due to different mesh densities, FE element types and material models.

Since, in conventional methods according to the type mentioned in the introduction, a transferring of stresses within a simulation chain leads to undesired shape alterations, the conventional transferring of stresses is not expedient.

SUMMARY OF THE INVENTION

The present invention is therefore based on the problem of making available a method of the type mentioned in the introduction, such that within the simulation chain after the transferring of a stress state (stress tensor) from an FE simulation result to a new target FE mesh with the use of the result in an FE simulation no undesired shape alterations occur.

The problem is solved according to the invention by a method of the type mentioned in the introduction, comprising:

a) providing a first data set $D_1$, which describes the FE simulation result with a stress state (stress tensor $S_1$) of the FE simulation FE-$N_1$ of the construction system or component of a first production operation, b) creating the new FE mesh geometry FE-N$_2$ (new FE target mesh) of the simulated construction system or component, c) transferring the stress state (stress tensor S$_1$) of the first data set D$_1$ provided in step b) to the new FE mesh geometry FE-N$_2$ of the construction system or component created in step b), d) performing an equilibrium calculation by using the stress tensor S$_1$ in the FE mesh geometry FE-N$_2$ of step c), wherein deformation of the construction system or component results, which deformation differs from the deformation in the FE mesh FE-N$_1$ according to step a) by a shape alteration u>a tolerance value ε, and e) iteratively repeating the equilibrium calculation according to step d) as a cyclic equilibrium iteration in the new FE mesh geometry FE-N$_2$ (new target FE mesh) of the construction system or component, wherein, in each cycle, a new stress state (stress tensor S$_3$, S$_4$ ... S$_n$) is applied to the new FE mesh geometry FE-N$_2$ of the construction system or component and in so doing, stress components that lead to undesired shape alterations u are decreased, until in a step f) a displacement/termination criterion of shape alteration u<tolerance value ε is achieved and is displayed.

Advantageously, after the displaying of the displacement/termination criterion of shape alteration u<ε in step f), the provision of a second data set D$_2$ follows in a step g), which describes the stress state (stress tensor S$_n$) of the FE mesh geometry FE-N$_2$ of the last repetition of the equilibrium calculation of step d), in which the displacement criterion/termination criterion of shape alteration u<tolerance ε is achieved.

Advantageously, a step h) can be provided, in which a simulated blank of the construction system or component is determined on the basis of step g).

Advantageously, furthermore, a step i) can be provided, in which a simulated forming of the simulated blank of the construction system or component takes place.

In addition, advantageously in a step j) a real production of a real blank, corresponding to the simulated blank, can take place for the production of the construction system or component in the second production operation.

Preferably, for the provision of the first data set D$_1$ according to step a) a scanning and/or reading-in of a model of the construction system or component is carried out.

The first production operation can be a pressing- and/or deep drawing operation of materials of the construction system or component, and the second production operation can be a painting operation of the construction system or component.

Furthermore, the invention relates to a program which can be loaded directly into the internal memory of a computer and comprises software sections by which a method according to one of Claims 1 to 6 is to be carried out, when the program runs on a computer.

The invention furthermore relates to a program which is suited to bringing a computer to carry out a method according to one of Claims 1 to 8.

Finally, the invention relates to a device which is set up, designed, constructed and/or equipped with a software for carrying out a method according to one of Claims 1 to 8.

With the method according to the invention, the transferring of stresses takes place within a simulation chain without an occurrence of undesired shape alterations, because the stresses are equalized in several iterative cycles so that the stresses are substantially retained and the stress components which lead to undesired effects are decreased. With the equilibrium iterations which are cyclically carried out for this in the new target FE system, in each cycle the new stress state is transferred to the required FE mesh geometry FE-N$_2$. The end of the iteration cycles is then evaluated through a displacement/termination criterion u<ε, wherein u represents the shape alteration and ε represents a tolerance value.

The method according to the invention therefore makes it possible to use stresses in a linked simulation of a production process chain despite different modelings and different FE solvers, and to substantially improve the evaluation of component characteristics and manufacturing processes.

Advantageously, tools and/or software solutions which are known per se can be used for the simulation of manufacturing process steps, in particular for the shaping of sheet metal parts and/or aluminium parts.

BRIEF DESCRIPTION OF THE DRAWINGS

The invention is now explained with reference to the drawings. In these.

EMBODIMENTS

Figure 1:
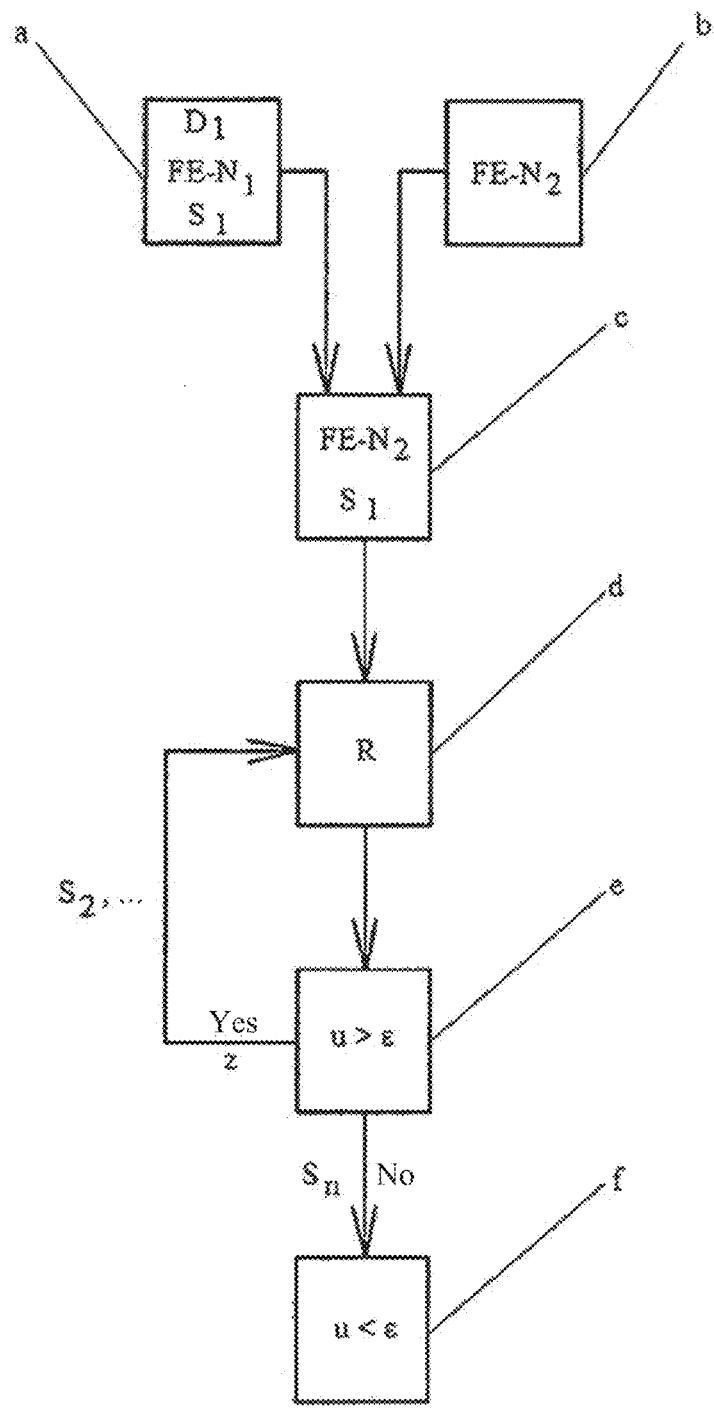
FIG. 1 is a block diagram of the method for transferring a stress state (stress tensor) of an FE simulation result FE-N$_1$ to a newly to be simulated new FE mesh geometry FE-N$_2$ of a modeled construction system or component in a simulation chain of production operations according to at least one embodiment of the invention.

FIG. 1 shows a block diagram of the method for transferring a stress state (stress tensor) S$_1$ of an FE simulation result FE-N$_1$ of a modeled construction system or component 1 to a newly to be applied FE mesh geometry FE-N$_2$ of the latest in the simulation chain of a production process according to at least one embodiment of the invention.

Here, in a step a) a first data set D$_1$ is provided, which describes the FE simulation result with a stress state of the FE simulation with the starting FE mesh FE-N$_1$ of the construction system or component 1.

In a step b) the new FE mesh geometry FE-N$_2$ (new FE target mesh) is applied to the construction system or component 1, which is associated with a second production operation.

Subsequently, in a step c) the stress state (stress tensor S$_1$) of the first data set D$_1$ provided in step a) is transferred to the new FE mesh geometry FE-N$_2$ of the construction system or component 1 created in step b).

Thereafter, in a step d) an equilibrium calculation R is carried out by using the stress tensor S$_1$ in the FE mesh geometry FE-N$_2$.

Here, in a subsequent step e) a deformation of the construction system or component 1 results, which differs from the deformation in the FE mesh FE-N$_1$. In so far as the shape alteration u is greater than a tolerance value ε, i.e. u>ε, the stress tensor is to be changed.

From step e) therefore, as FIG. 1 shows, an iteration step Z firstly leads to the step d), in order to repeat the equilibrium calculation R, wherein a new stress state (stress tensor $S_2$) is applied to the FE mesh geometry FE-$N_2$ of the construction system or component 1 and, in so doing, stress components which lead to undesired shape alterations u, are reduced. Subsequently, the iteration loop leads back to step e).

If a state of undesired shape alterations u>ε (display YES) continues to result from the equilibrium calculation R in step e), then the loop is run through iteratively several times, so that an iterative repetition of the equilibrium calculation R takes place according to step d) as a cyclic equilibrium iteration with stress tensors $S_3$, $S_4$, ..., $S_n$ in the FE mesh geometry FE-$N_2$ (in the new target FE mesh) of the construction system or component 1.

In each cycle, therefore, a respectively new stress state (stress tensor $S_2$, $S_3$, $S_4$, ..., $S_n$) is applied to the new FE mesh geometry FE-$N_2$ of the construction system or component 1. At the same time, stress components which lead to undesired shape alterations u are further decreased until in step e) a displacement/termination criterion of shape alteration u<tolerance value ε is achieved and the latter is displayed in the subsequent step f).

The displacement/termination criterion signals a stress state (stress tensor $S_n$) in which stress components which lead to undesired shape alterations in the FE mesh geometry FE-$N_2$ of the simulated construction system or component 1 associated with the second production operation are decreased.

Figure 2:
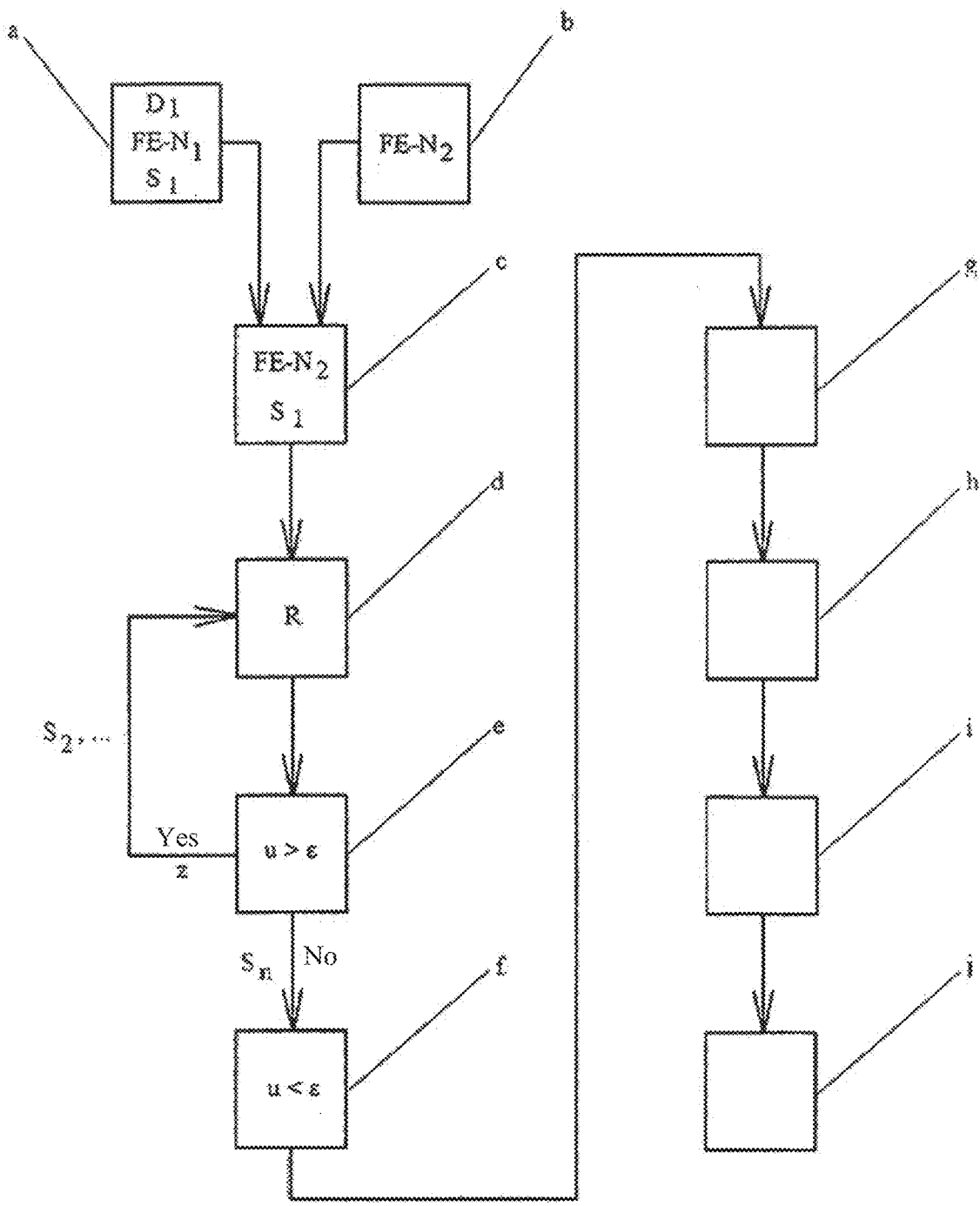
FIG. 2 is a block diagram from which advantageous further developments of the method according to FIG. 1 according to at least one embodiment of the invention can be seen.

FIG. 2 shows a block diagram corresponding to FIG. 1, wherein, however, advantageous further developments of the method according to FIG. 1 are illustrated diagrammatically.

Thus, as FIG. 2 illustrates, after the displaying of the displacement/termination criterion of shape alteration u<tolerance value ε in step f), the provision of a second data set $D_2$ can take place in a step g), which describes the stress state (stress tensor $S_n$) of the FE mesh geometry FE-$N_2$ of the last repetition of the equilibrium calculation in step d), as a result of which the displacement criterion/termination criterion of shape alteration u<tolerance ε is achieved in step f).

As FIG. 2 shows, advantageously a step h), in which a simulated blank of the construction system or component is determined on the basis of the second data set $D_2$, and furthermore a step i) can be provided, in which a simulated forming of the simulated blank of the construction system or component 1 takes place.

Furthermore, a step j) can be provided, in which a real production of a real blank, corresponding to the simulated blank, for the production of the construction system or component 1 takes place in the second production operation.

Figure 3:
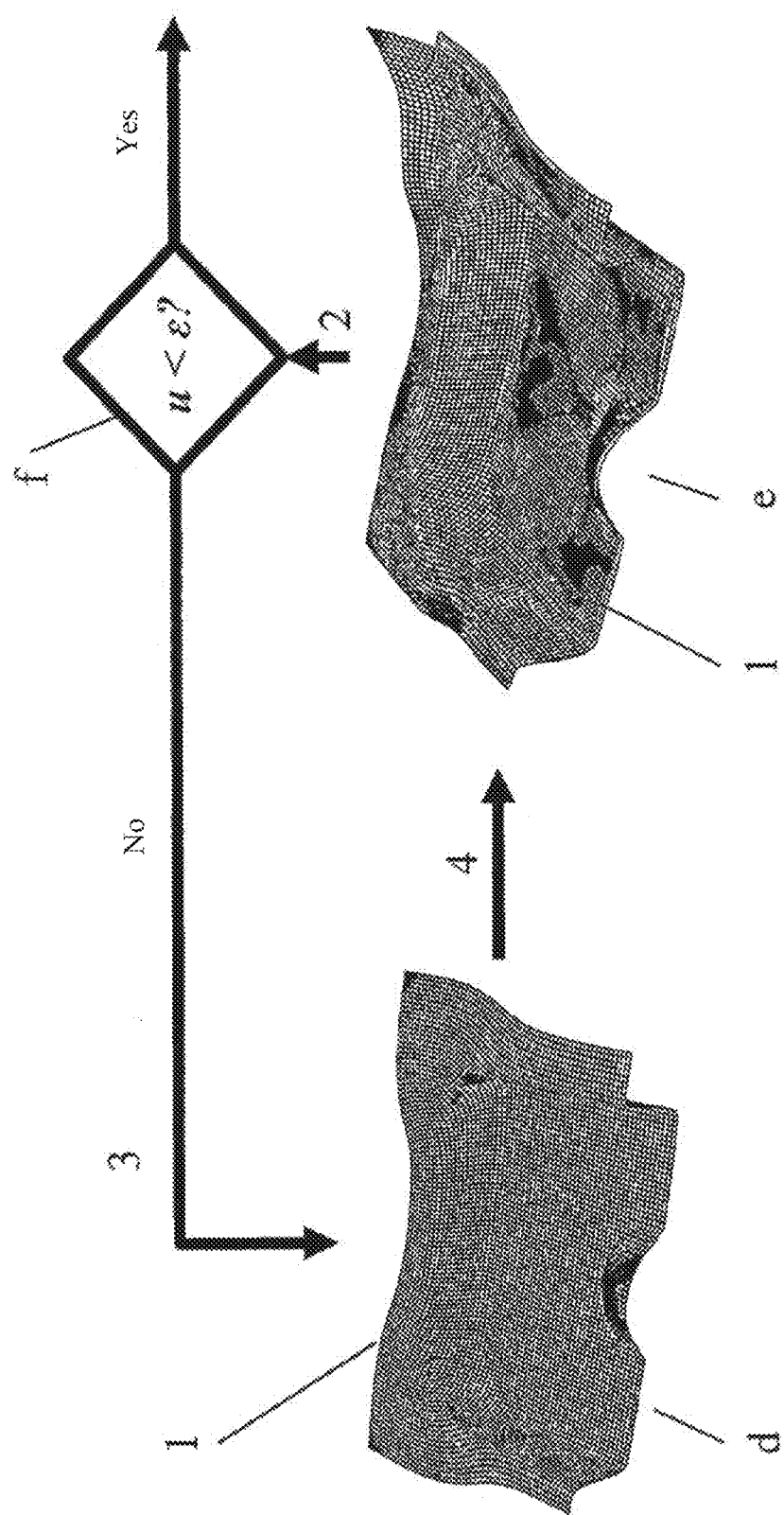
FIG. 3 is a diagrammatic figure illustration of the stress transfer without undesired shape alteration according to steps d) to f) of the method according to FIG. 1.

FIG. 3 is a diagrammatic figure illustration of the stress transfer (enhanced stress mapping) without undesired shape alteration according to steps d) to f) and of the loop z for the iterative repetition of the equilibrium calculation R in the method sequence according to FIG. 1. Thus, FIG. 3 shows, bottom left, the simulated component 1 in step d) at the stage of the transferred stress state $S_1$. A deformation and recovery has been previously simulated, wherein an equilibrium calculation has taken place iteratively in the starting FE mesh FE-$N_1$.

This results in the state of the component 1, illustrated bottom right in FIG. 3, in step e) with undesired shape alteration u>tolerance value ε as a result of the disequilibrium of the stress state, illustrated with 10-times exaggeration. After multiple running through of the loop z, symbolized by the arrows 2, 3 and 4, for the iterative repetition of the equilibrium calculation R and the gradual decreasing of stress components which lead to undesired shape alterations u in the FE mesh geometry FE-$N_2$ of the component 1 (update of the stress state), the displacement/termination criterion of shape alteration u<tolerance value ε is reached, as can be seen from the square in the loop z top right in FIG. 3, and the fulfilling of this condition is displayed in step f).

Figure 4:
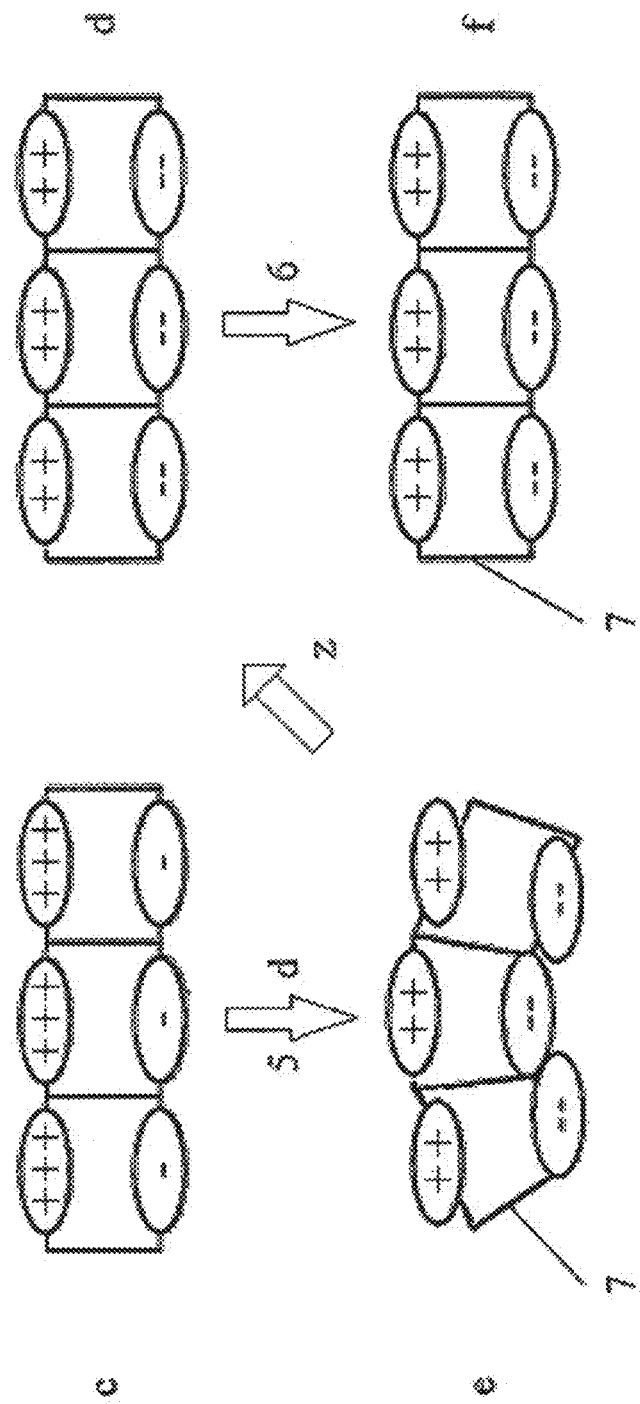
FIG. 4 is a further diagrammatic illustration of a stress transfer (enhanced stress mapping) by means of steps c) to f) of the method according to FIG. 1.

In FIG. 4, the stress transfer (enhanced stress mapping) by means of steps c) to f) of the method according to FIG. 1 is illustrated diagrammatically in detail.

Here, the rectangle shown top left in FIG. 4, which symbolizes finite elements 7 in a closed tool forming these, embodies step c) of the method according to FIG. 1, in which the transfer of the stress state (stress tensor $S_1$) of the first data set $D_1$, provided in step a), to the new FE mesh geometry FE-$N_2$, created in step b), of the construction system or component 1 takes place, wherein a disequilibrium of the transferred compressive stresses, symbolized by plus signs, and of the transferred tensile stress, symbolized by minus signs, is given.

As is indicated by the arrow 5, subsequently in step d) of the method the carrying out of the equilibrium calculation R takes place by using the stress tensor $S_1$ in the FE mesh geometry FE-$N_2$ of step c), which in the step e) illustrated bottom left in FIG. 4 produces a shape alteration of the construction system or component 1, which differs from the shape alteration in the FE mesh FE-$N_1$ in step a) by an undesired shape alteration of u>tolerance value ε as a result of the disequilibrium.

By means of a loop, which is symbolized by the arrow z and comprises steps d) and e), subsequently, as shown top right in FIG. 4, a change (update) of the stress state takes place through iterative repetition of the equilibrium calculation R in step d) as a cyclic equilibrium iteration in the FE mesh geometry FE-$N_2$ of the construction system or component 1, wherein in each cycle a respectively new stress state (stress tensor $S_3$, $S_4$, ... $S_n$) is applied to the new FE mesh geometry FE-$N_2$ of the construction system or component 1, and stress components which lead to undesired shape alterations u are decreased until the required condition, i.e. the displacement/termination criterion of u<tolerance value ε is achieved and is displayed in step f), as can be seen from FIG. 4 bottom right.

As is illustrated in FIG. 4, the stress tensor can be altered iteratively until the shape alteration u, which is caused by the transfer of the stress tensor $S_1$ from the starting FE mesh FE-$N_1$ into the target FE mesh FE-$N_2$ falls below a predetermined tolerance value ε. The deformation of the construction system or component 1 with the stress tensor S in the target FE mesh FE-$N_2$ corresponds substantially to the deformation of the construction system or component 1 with the stress tensor $S_n$ in the starting FE mesh FE-$N_1$.

It shall be understood that the embodiments of the present invention are not restricted to the specific structures, method steps or materials which are disclosed here, but rather can be extended to their equivalents, as is recognizable by an average specialist in the relevant fields.

In addition, it shall be understood that the terminology which is used here is used solely for describing particular embodiments and is not to be construed as restrictive. The described features, structures or characteristics can be combined in any suitable manner in one or more embodiments.

LIST OF REFERENCE NUMBERS

1 construction system, component
2 arrow
3 arrow 4 arrow
5 arrow
6 arrow
7 finite elements
a step
b step
c step
d step
e step
f step
g step
h step
i step
j step
z iteration loop
$D_1$ first data set
$D_2$ second data set
$FE-N_1$ FE mesh according to step a)
$FE-N_2$ FE mesh geometry, created in step c)
R equilibrium calculation
$S_1, S_2, S_3, S_4 \ldots S_n$ stress tensor
u shape alteration
ε tolerance value

The invention claimed is:

1. A method comprising:
    a) providing a first data set, which describes a Finite Element (FE) simulation result with a stress state of a first FE simulation of a first production operation of a component, wherein a shape of the component results in a first FE mesh,
    b) creating a second FE mesh of the simulated component, which second FE mesh is associated with a second production operation,
    c) transferring the stress state of the provided first data set to the second FE mesh of the component,
    d) performing an equilibrium calculation by using the stress state in the second FE mesh, wherein the shape of the component varies by a shape variation $u_1$>tolerance value ε between the shape in the first FE mesh and the shape in the second FE mesh due to a different mesh density, FE element type and material model in the second FE mesh prior to carrying out the second production operation simulation of the component,
    e) iteratively repeating the equilibrium calculation as a cyclic equilibrium iteration in the second FE mesh of the component prior to carrying out the second production operation simulation of the component, wherein, in each cycle, a respectively new stress state is applied to the second FE mesh of the component and, in so doing, stress components that lead to shape variations $u_{2,\ldots,n-1}$ between the shape in the first FE mesh and the shape in the second FE mesh due to the different mesh density, FE element type and material model in the second FE mesh are decreased until a termination criterion of shape variation $u_n$<tolerance value between the shape in the first FE mesh and the shape in the second FE mesh due to the different mesh density, FE element type and material model in the second FE mesh is achieved, and
    f) displaying of the fulfilled condition of $u_n$<ε.

2. The method according to claim 1, wherein after achieving and/or displaying the fulfilled condition of $u_n$<ε, a second data set is provided, which describes the stress state of the component with the second FE mesh, in which the termination criterion of shape alteration $u_n$<tolerance ε is achieved.

3. The method according to claim 1, further comprising: determining a simulated blank of the component on the basis of the provided second data set.

4. The method according to claim 1, further comprising: simulated forming of a simulated blank of the component.

5. The method according to claim 1, comprising: real production of a real blank corresponding to the simulated blank for producing the component in the second production operation.

6. The method according to claim 1, wherein for providing the first data set a scanning and/or reading in of a model of the component takes place.

7. The method according to claim 1, wherein the first production operation is a pressing and/or deep drawing operation of materials of the component.

8. The method according to claim 1, wherein the second production operation is a painting operation of the component.

9. The method according to claim 1, the method further comprising:
    g) subsequently performing the second production operation simulation of the component in the second FE mesh.

* * * * *